United States Patent
Russ et al.

(10) Patent No.: US 9,267,423 B2
(45) Date of Patent: Feb. 23, 2016

(54) METHODS AND SYSTEMS FOR INCREASING AIRFLOW THROUGH A CHARGE AIR COOLER TO DECREASE CHARGE AIR COOLER CONDENSATE

(71) Applicant: Ford Global Technologies, LLC, Dearborn, MI (US)

(72) Inventors: Stephen George Russ, Canton, MI (US); Philip Andrew Fabien, Livonia, MI (US); Michael P. Mandjack, Northville, MI (US); Charles Allen Cockerill, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/295,176

(22) Filed: Jun. 3, 2014

(65) Prior Publication Data

US 2015/0345371 A1   Dec. 3, 2015

(51) Int. Cl.
*F02M 15/00* (2006.01)
*F02B 29/04* (2006.01)
*F02D 41/00* (2006.01)
*F02B 37/12* (2006.01)

(52) U.S. Cl.
CPC .............. *F02B 29/04* (2013.01); *F02B 37/12* (2013.01); *F02D 41/0007* (2013.01)

(58) Field of Classification Search
CPC ...... F02B 29/0475; F02B 29/04; F02B 37/12; F01P 2060/02; F02D 17/02; F02D 41/00887; F02D 41/0007; F01L 13/0005; F01L 2013/001
See application file for complete search history.

(56) References Cited

U.S. PATENT DOCUMENTS

| | | | |
|---|---|---|---|
| 2011/0265771 A1 | 11/2011 | Banker et al. | |
| 2012/0198837 A1 | 8/2012 | Medina | |
| 2014/0048048 A1 | 2/2014 | Glugla et al. | |
| 2014/0100074 A1 | 4/2014 | Glugla | |
| 2014/0102424 A1* | 4/2014 | Norman | 123/542 |
| 2014/0109568 A1 | 4/2014 | Glugla et al. | |
| 2014/0157772 A1 | 6/2014 | Glugla et al. | |
| 2014/0158096 A1* | 6/2014 | Leone et al. | 123/563 |
| 2014/0343827 A1* | 11/2014 | Glugla et al. | 701/108 |
| 2014/0352663 A1* | 12/2014 | Glugla et al. | 123/443 |
| 2015/0047374 A1* | 2/2015 | Ulrey et al. | 62/79 |

OTHER PUBLICATIONS

Leone, Thomas et al., "Engine Control for Catalyst Regeneration," U.S. Appl. No. 13/868,742, filed Apr. 23, 2013, 50 pages.
Morelli, Anthony et al, "Compressor Recirculation Valve Control to Reduce Charge Air Cooler Condensate," U.S. Appl. No. 13/886,101, filed May 2, 2013, 40 pages.

(Continued)

*Primary Examiner* — Marguerite McMahon
(74) *Attorney, Agent, or Firm* — Julia Voutyras; Alleman Hall McCoy Russell & Tuttle LLP

(57) ABSTRACT

Methods and systems are provided for increasing airflow through a charge air cooler (CAC) in order to purge condensate from the CAC. In one example, a method includes increasing airflow through the CAC while maintaining torque by selectively deactivating one or more engine cylinders and increasing boost. The number of deactivated cylinders may be based on an amount of condensate within the CAC.

17 Claims, 8 Drawing Sheets

(56) References Cited

OTHER PUBLICATIONS

Glugla, Chris P. et al., "Variable Displacement Engine Control System and Method," U.S. Appl. No. 13/896,059, filed May 16, 2013, 36 pages.

Glugla, Chris P. et al., "Variable Displacement Engine Control System and Method," U.S. Appl. No. 13/968,240, filed Aug. 15, 2013, 65 pages.

Glugla, Chris P. et al., "Variable Displacement Engine Control System and Method," U.S. Appl. No. 13/968,252, filed Aug. 15, 2013, 67 pages.

Pursifull, Ross D., "Method and Systems for Reducing Charge Air Cooler Condensate Using a Secondary Intake Throttle," U.S. Appl. No. 14/084,295, filed Nov. 19, 2013, 38 pages.

Glugla, Chris P., "Methods and System for Pre-Ignition Control in a Variable Displacement Enging," U.S. Appl. No. 14/201,296, filed Mar. 7, 2014, 59 pages.

Glugla, Chris P. et al., "Method of Fuel Injection for a Variable Displacement Engine," U.S. Appl. No. 14/294,035, filed Jun. 2, 2014, 48 pages.

* cited by examiner

METHODS AND SYSTEMS FOR INCREASING AIRFLOW THROUGH A CHARGE AIR COOLER TO DECREASE CHARGE AIR COOLER CONDENSATE

FIELD

The present description relates generally to methods and systems for controlling a vehicle engine to decrease condensate formation within a charge air cooler.

BACKGROUND/SUMMARY

Engines may utilize a turbocharger or supercharger to compress ambient air entering the engine in order to increase power. Compression of the air may cause an increase in air temperature, thus, an intercooler or charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point temperature. Further, when the charge air entering the CAC is boosted (e.g., an induction pressure and boost pressure are greater than atmospheric pressure), condensate may form if the CAC temperature falls below the dew point temperature. As a result, condensate may collect at the bottom of the CAC, or in the internal passages of the CAC. When torque is increased, such as during acceleration, increased mass air flow may strip the condensate from the CAC, drawing it into the engine and increasing the likelihood of engine misfire and combustion instability.

Other attempts to address engine misfire due to condensate ingestion involve avoiding condensate build-up. However, the inventors herein have recognized potential issues with such methods. Specifically, while some methods may reduce or slow condensate formation in the CAC, condensate may still build up over time. If this build-up cannot be stopped, ingestion of the condensate during acceleration may cause engine misfire. Another method to prevent engine misfire due to condensate ingestion includes trapping and/or draining the condensate from the CAC. While this may reduce condensate levels in the CAC, condensate is moved to an alternate location or reservoir, which may be subject to other condensate problems such as freezing and corrosion.

Condensate build-up in the CAC may also be addressed by removing condensate from the CAC before it builds up to a threshold level by increasing airflow through the CAC. For example, as shown in 2014/0048048, adjusting a valve positioned in an inlet tank of a variable volume CAC may adjust the airflow rate through the CAC. Increased airflow through the CAC may reduce condensate build-up in the CAC. However, the inventors herein have recognized potential issues with such systems. As one example, a variable volume CAC may require additional parts and controls for controlling airflow through the CAC.

In one example, the issues described above may be addressed by a method for transiently increasing airflow through a charge air cooler (CAC) of the engine by one or more of operating in a VDE mode or opening a compressor bypass valve (CBV) and maintaining engine torque by increasing boost pressure. In this way, the increased airflow may purge condensate from the CAC and reduce engine misfire events and/or unstable combustion due to ingestion of large amounts of condensate by the engine.

As one example, an engine controller may increase airflow through the CAC by one or more of operating the engine in the VDE mode or opening the CBV while increasing boost to maintain torque in response to a condensate level of the CAC increasing above a threshold level. In one example, operating in the VDE mode includes selectively deactivating a number of engine cylinders, the number of engine cylinders based on the condensate level. The selectively deactivating the number of engine cylinders includes deactivating fueling to the deactivated cylinders while maintaining intake and exhaust valve operation. In another example, the CBV may be arranged in a bypass passage positioned between an intake passage downstream of the CAC and the intake passage upstream of a compressor. As such, opening the CBV recirculates air around the CAC and the compressor, thereby increasing airflow through the CAC. In an alternate example, the increasing CAC airflow may be performed periodically at set intervals. In this way, condensate build-up may be reduced, thereby reducing engine misfire events.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
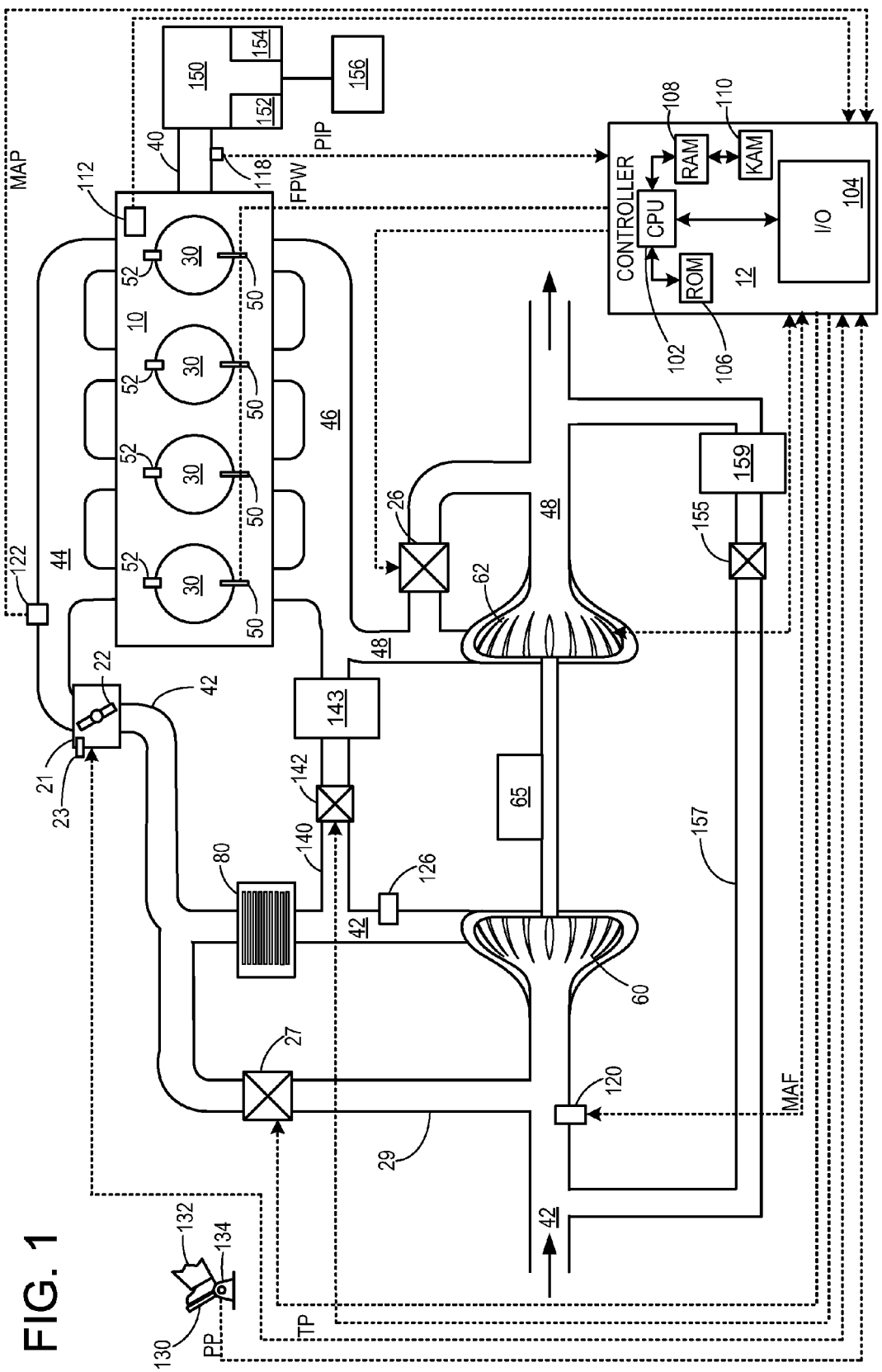
FIG. 1 is a schematic diagram of an example engine system including a charge air cooler.
Figure 2:
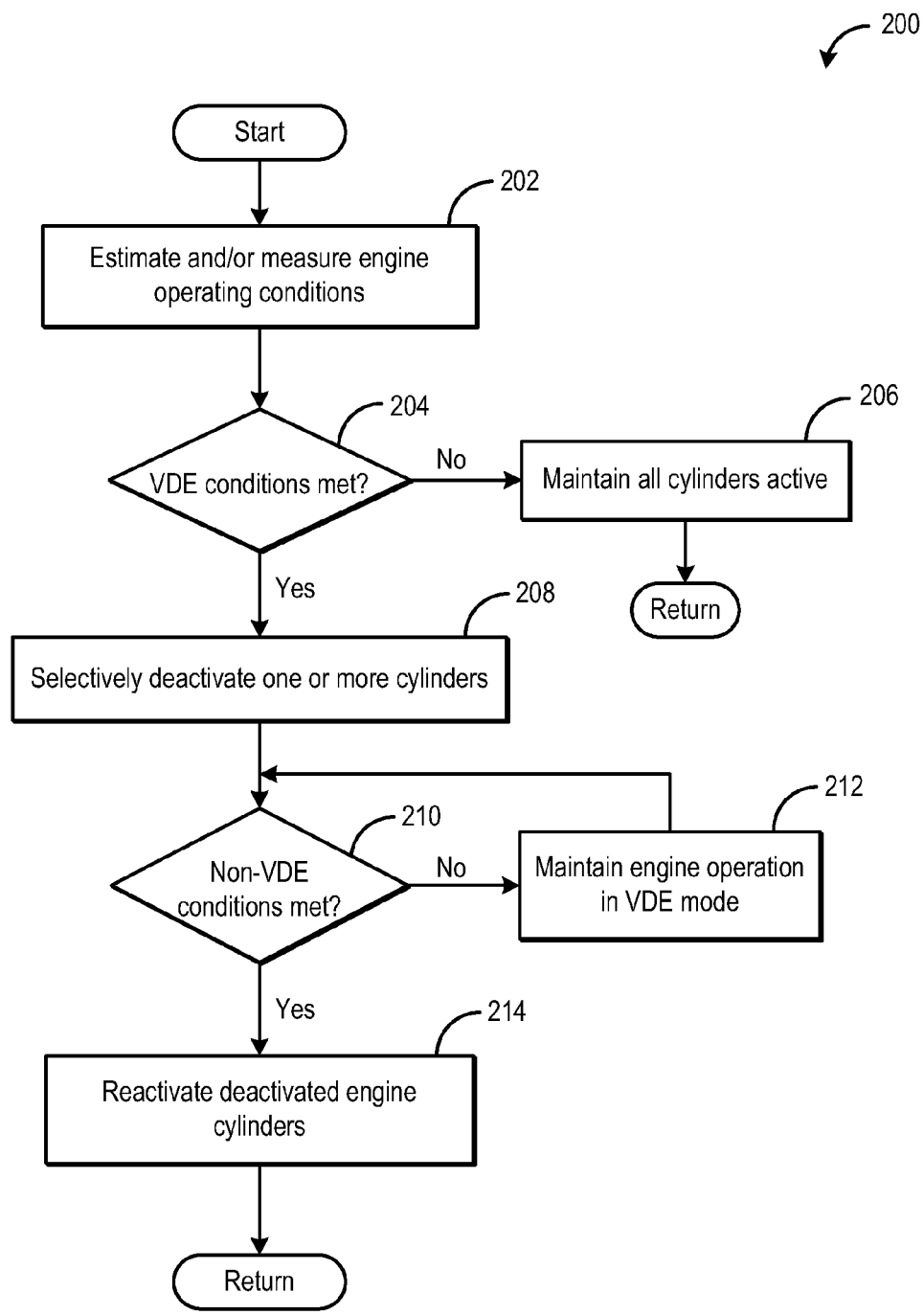
FIG. 2 shows a flow chart of a method for operating an engine in VDE mode.
Figure 3:
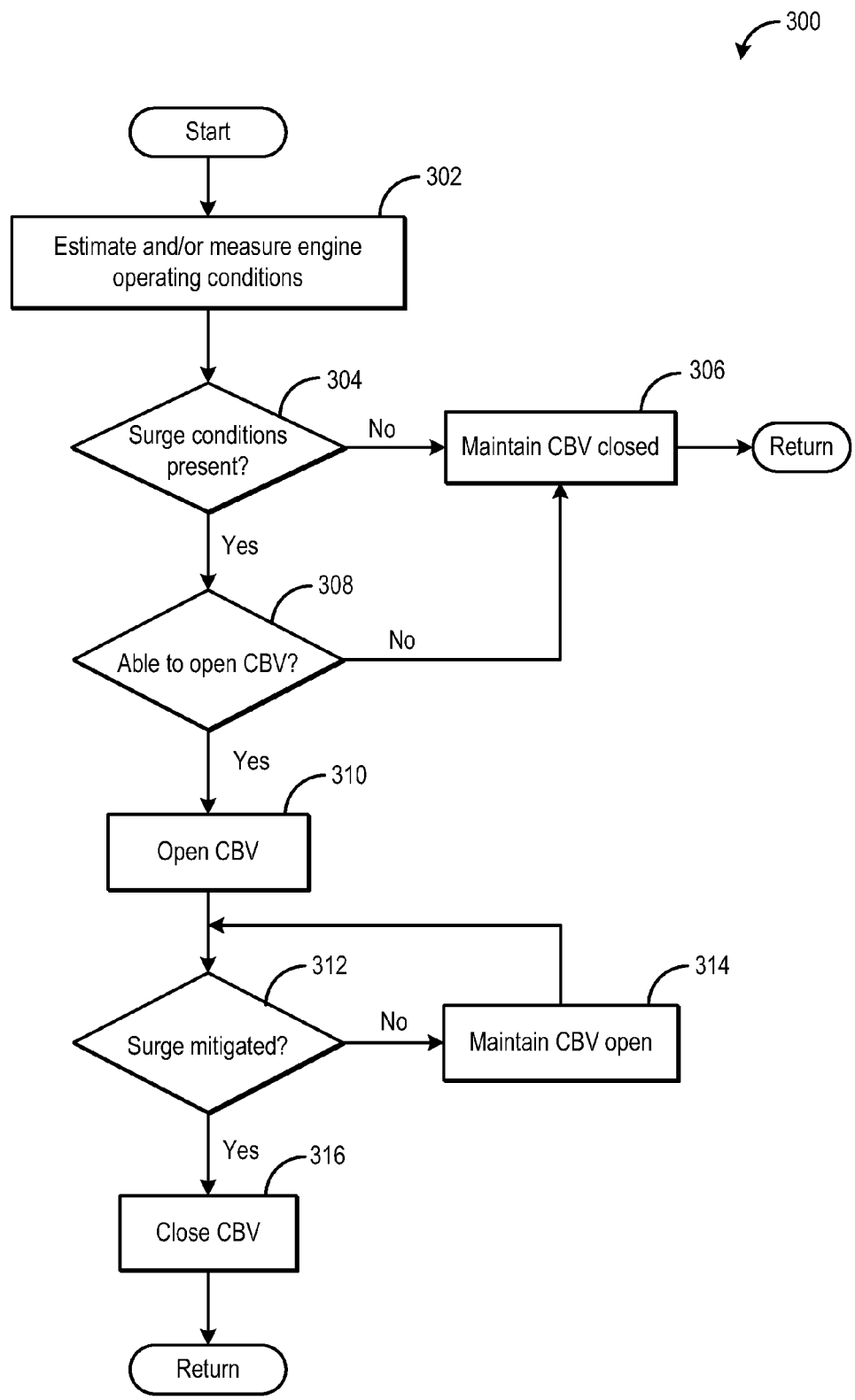
FIG. 3 shows a flow chart of a method for operating a compressor bypass valve.
Figure 4:
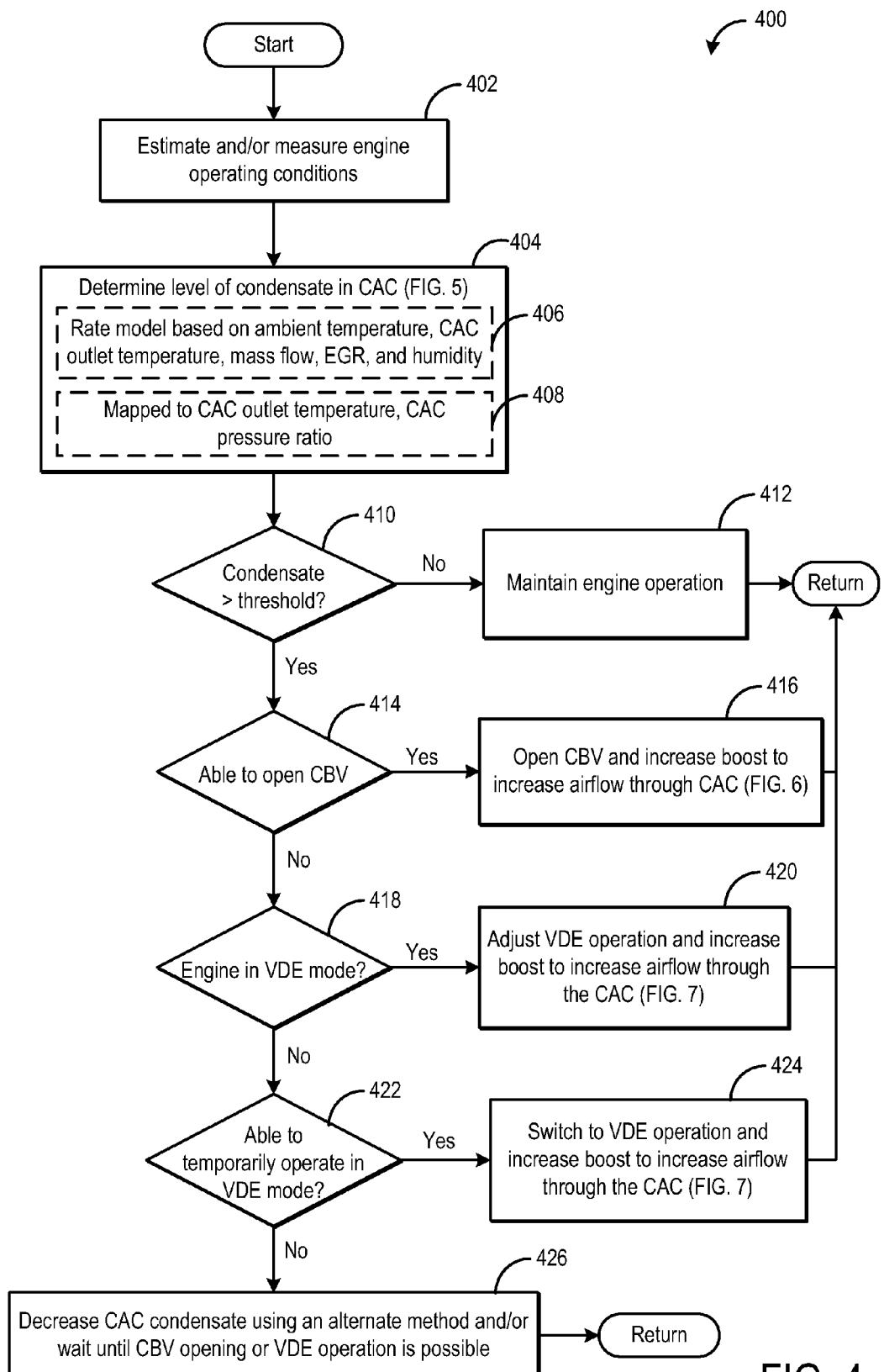
FIG. 4 shows a flow chart of a method for increasing airflow through a charge air cooler to purge condensate from the charge air cooler.
Figure 5:
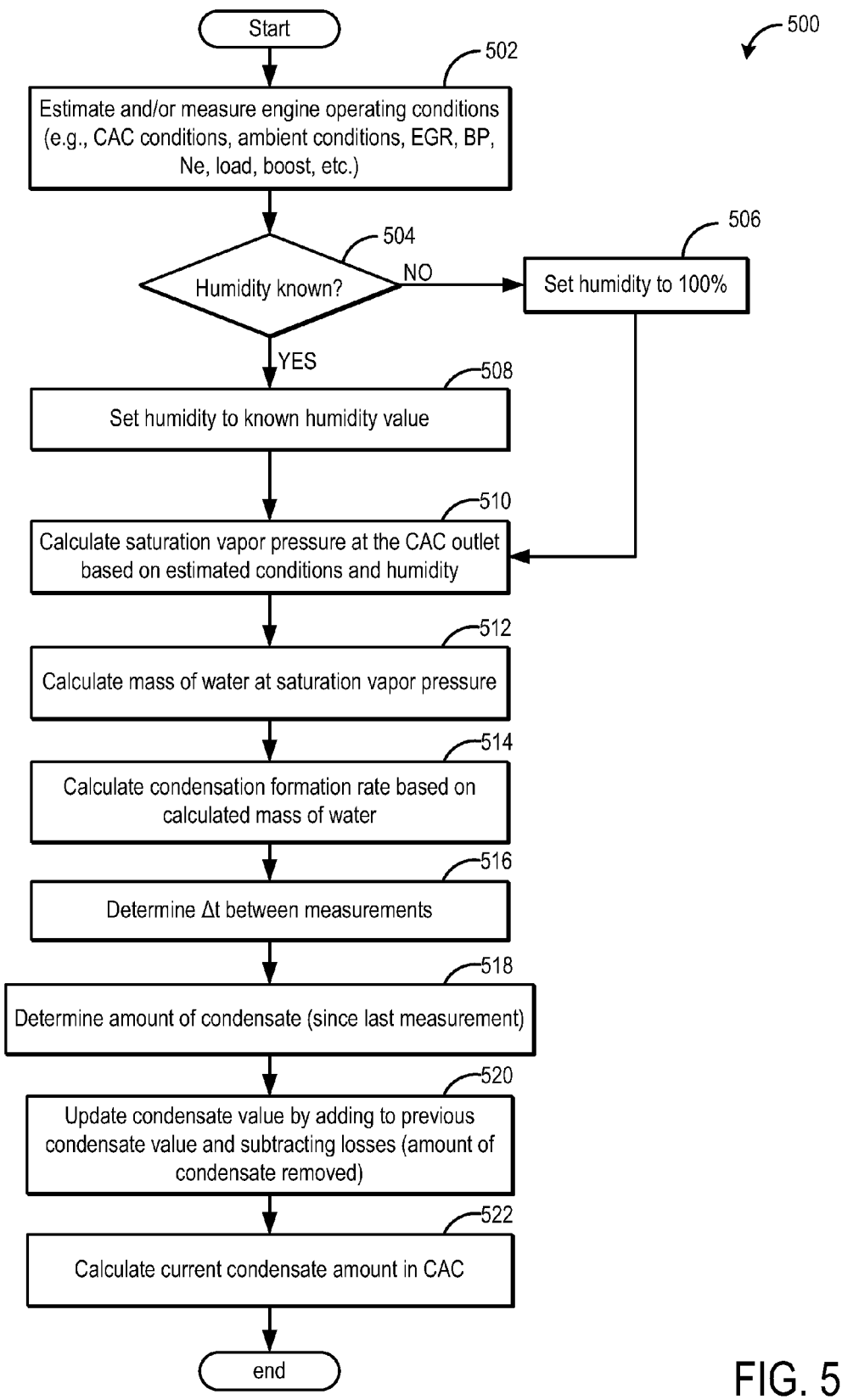
FIG. 5 shows a flow chart of a method for inferring a condensate level at the charge air cooler.
Figure 6:
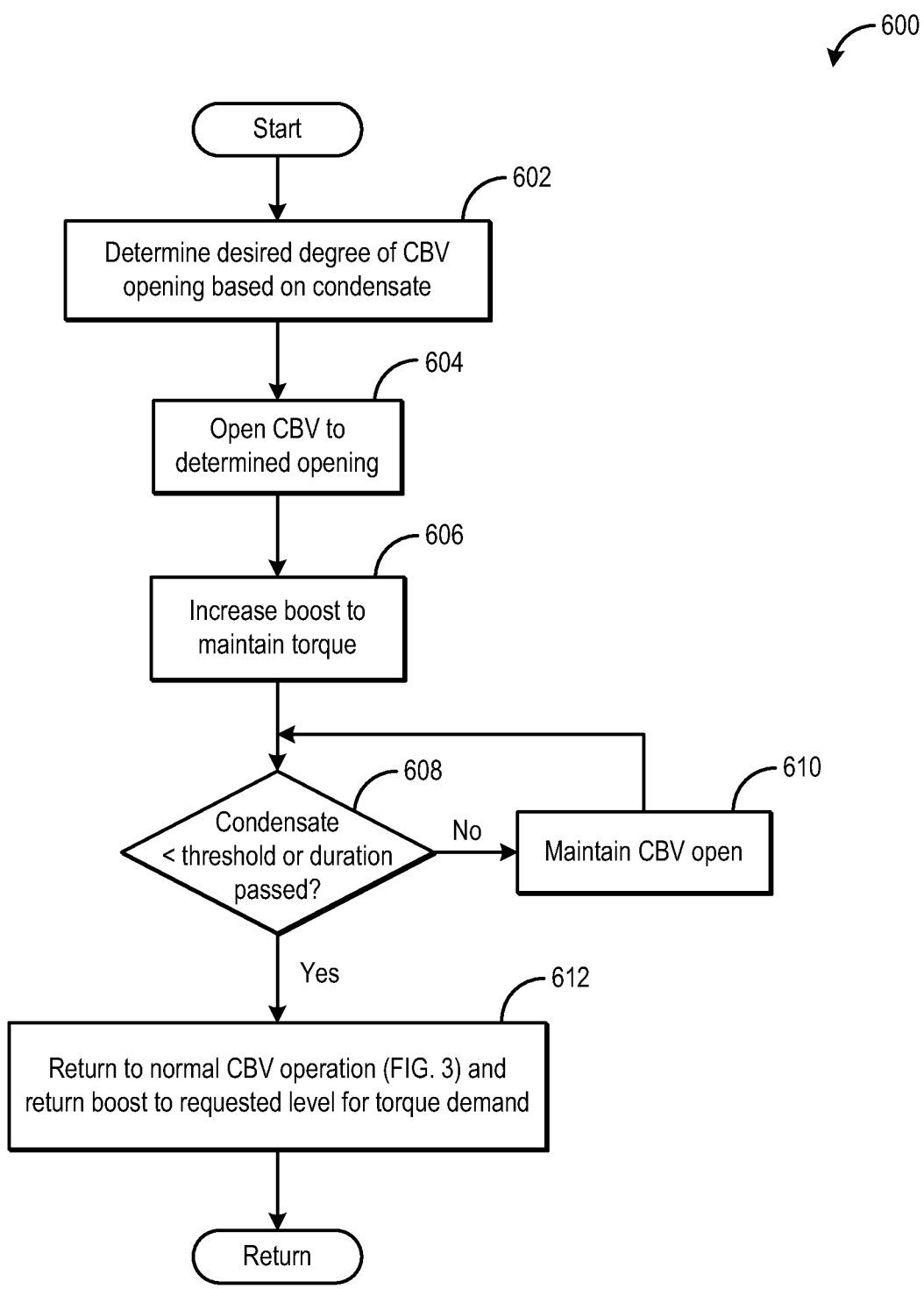
FIG. 6 shows a flow chart of a method for increasing airflow through a charge air cooler to purge condensate from the charge air cooler by opening a compressor bypass valve while increasing boost.
Figure 7:
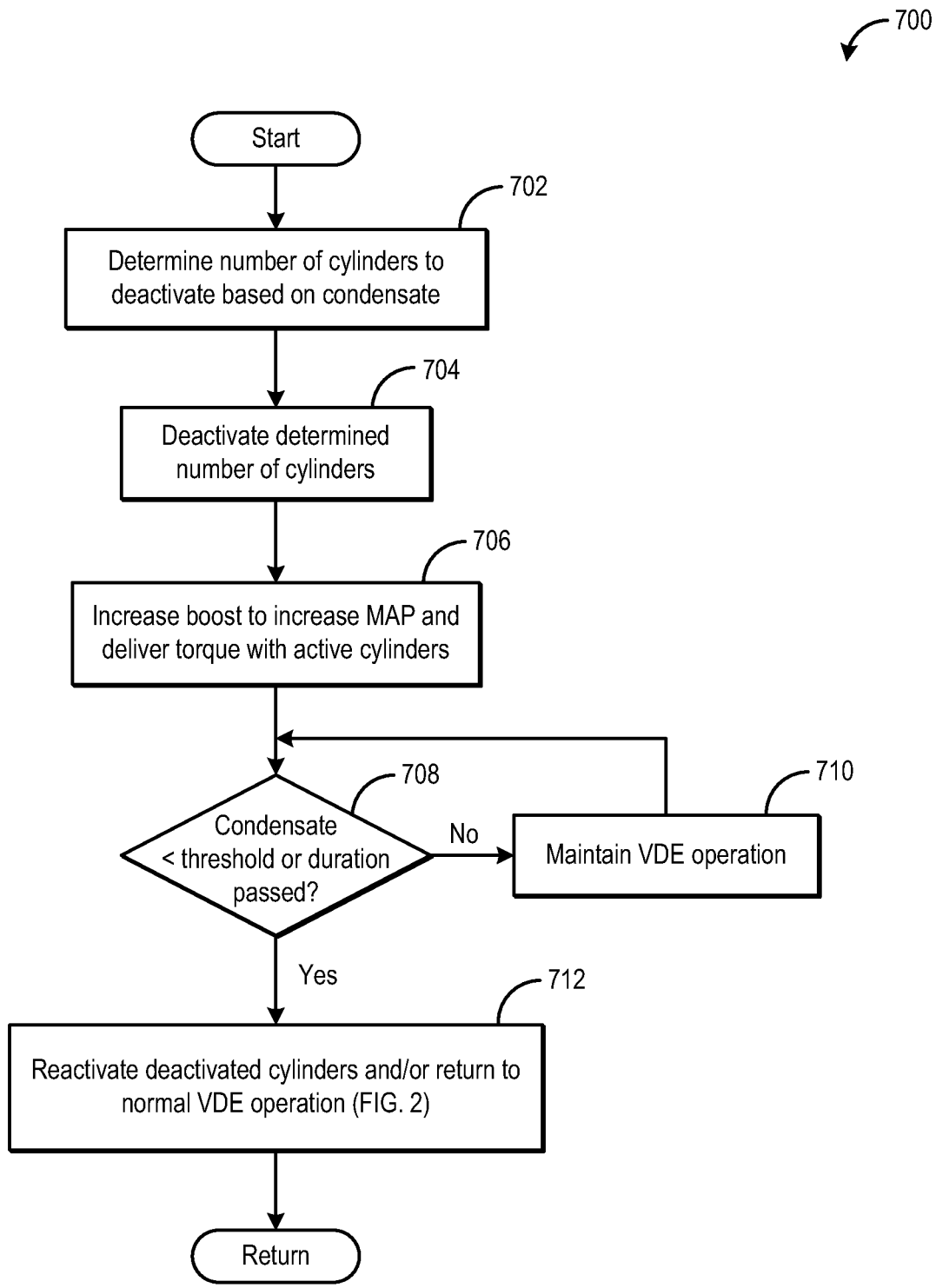
FIG. 7 shows a flow chart of a method for increasing airflow through a charge air cooler to purge condensate from the charge air cooler by deactivating one or more engine cylinders while increasing boost.
Figure 8:
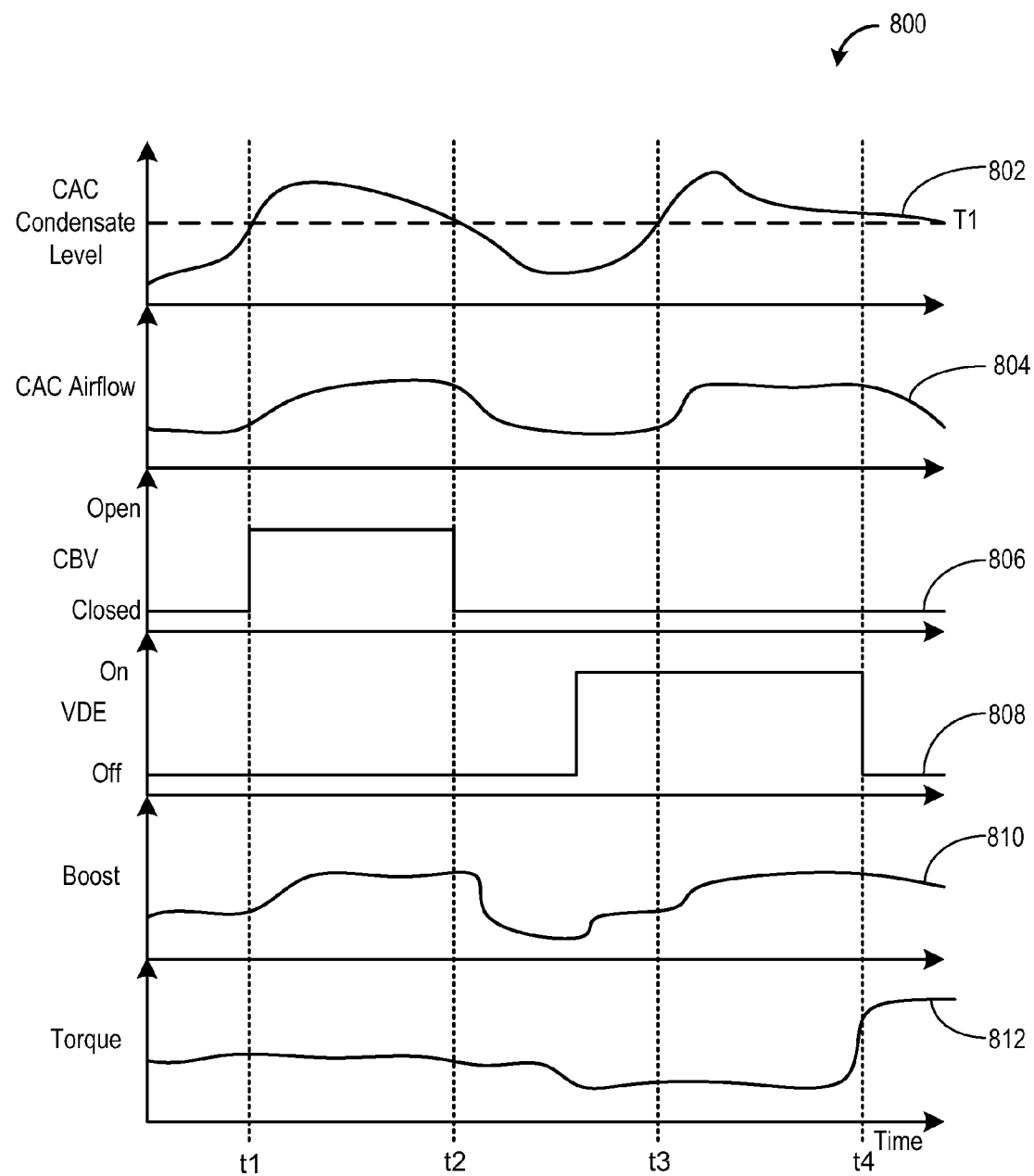
FIG. 8 is a graph of example adjustments to engine operating parameters to increase airflow through a charge air cooler responsive to charge air cooler condensate.

The following description relates to systems and methods for increasing airflow through a charge air cooler (CAC), such as the CAC shown in FIG. 1, in order to remove condensate from the CAC and reduce condensate build-up. An engine system, such as the engine system shown in FIG. 1, may be capable of operating in a VDE mode wherein one or more engine cylinders may be selectively deactivated. The engine system may also include a bypass passage including a compressor bypass valve (CBV) around both the CAC and compressor. Methods for operating the engine in a VDE mode and operating the CBV are shown in FIG. 2 and FIG. 3, respectively. In response to condensate build-up in the CAC, an engine controller may increase airflow through the CAC to purge condensate from the CAC. FIG. 4 shows a method for increasing airflow through the CAC by either opening the CBV or operating the engine in VDE mode based on engine operating conditions. FIG. 5 shows a method for determining the condensate level in the CAC. A method for increasing airflow through the CAC by opening the CBV while increasing boost is shown at FIG. 6. Similarly, FIG. 7 shows a method for increasing airflow through the CAC by deactivating one or more engine cylinders while increasing boost. FIG. 8 shows example adjustments to the CBV, VDE operation, and additional engine operating conditions based on CAC condensate.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. In another example, the engine 10 may be a V-engine with two banks of cylinders 30. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle via an intermediate transmission system 150. Further, a starter motor may be coupled to crankshaft 40 via a flywheel to enable a starting operation of engine 10. The crankshaft 40 may also be used to drive an alternator (not shown in FIG. 1).

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have four available gears, where transmission gear four (transmission fourth gear) is the highest available gear and transmission gear one (transmission first gear) is the lowest available gear. In other embodiments, the vehicle may have more or less than four available gears. As elaborated herein, a controller may vary the transmission gear (e.g., upshift or downshift the transmission gear) to adjust an amount of torque conveyed across the transmission and torque converter to vehicle wheels 156 (that is, an engine shaft output torque). As the transmission shifts to a lower gear, the engine speed (Ne or RPM) increases, increasing engine airflow. An intake manifold vacuum generated by the spinning engine may be increased at the higher RPM.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in. In an alternate embodiment, compression ignition may be used to ignite the injected fuel. The intake manifold 44 may receive intake air from an intake passage 42. An engine intake of the engine 10 includes the intake manifold 44 and the intake passage 42. The intake passage 42 and/or intake manifold 44 includes a throttle 21 having a throttle plate 22 to regulate flow to the intake manifold 44. In this particular example, the position (TP) of the throttle plate 22 may be varied by the controller 12 to enable electronic throttle control (ETC). In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44.

In some embodiments, additional throttles may be present in intake passage 42, such as a throttle upstream of a compressor 60 (not shown). Additionally, the throttle position or throttle angle of the throttle 21 may be determined with a throttle position sensor 23 positioned at the throttle 21. In one example, the throttle position sensor 23 may measure the angle of the throttle plate 22 relative to the direction of air flow through the intake passage 42. For example, when the throttle plate 22 is completely closed (and blocking airflow through the intake passage 42), the throttle angle may be approximately zero degrees. When the throttle plate 22 is completely open (and perpendicular to airflow) the throttle angle may be approximately 90 degrees.

Further, in the disclosed embodiments, an exhaust gas recirculation (EGR) system may route a desired portion of exhaust gas from the exhaust passage 48 to the intake passage 42 via an EGR passage, such as high pressure EGR passage 140. The amount of EGR provided to the intake passage 42 may be varied by the controller 12 via an EGR valve, such as high pressure EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger through EGR passage 140. FIG. 1 also shows a low pressure EGR system where EGR is routed from downstream of turbine of a turbocharger to upstream of a compressor of a turbocharger through low pressure EGR passage 157. A low pressure EGR valve 155 may control the amount of EGR provided to the intake passage 42. In some embodiments, the engine may include both a high pressure EGR and a low pressure EGR system, as shown in FIG. 1. In other embodiments, the engine may include either a low pressure EGR system or a high pressure EGR system. When operable, the EGR system may induce the formation of condensate from the compressed air, particularly when the compressed air is cooled by the charge air cooler 80. For example, the low pressure EGR passage 157 may include a low pressure EGR cooler 159 and the high pressure EGR passage 140 may include a high pressure EGR cooler 143.

The engine 10 may further include a compression device such as a turbocharger or supercharger including at least a compressor 60 arranged along the intake passage 42. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12. For example, as shown in FIG. 1, the engine 10 may include an electric turbocharger assist device 65. The electric turbocharger assist device 65 may be chargeable and then provide power to the compressor 60 when increased boost is required. As such, the electric turbocharger assist device may enable the compressor 60 to reach a desired rotational speed for delivering required boost more quickly than if the turbine 62 alone was providing driving power to the compressor 60. In another example, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass valve (CBV) 27 configured to divert intake air around the compressor 60. As shown in FIG. 1, the CBV 27 may be positioned in a bypass passage 29 bypassing the compressor 60 and the CAC 80. Specifically, an air inlet to the bypass passage 29 may be downstream of the CAC 80 and an air outlet from the bypass passage 29 and to the intake passage 42 may be upstream of the compressor 60. As such, when the CBV 27 is opened, charge air may be diverted from downstream of the CAC 80 to upstream of the compressor 60. The wastegate 26 and/or the CBV 27 may be controlled by the controller 12 to be opened when a lower boost pressure is desired, for example. For example, in response to compressor surge or a potential compressor surge event, the controller 12 may open the CBV 27 to decrease pressure at the outlet of the compressor 60. This may reduce or stop compressor surge.

The intake passage 42 may further include the charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point temperature. Further, when the charge air entering the CAC is boosted (e.g., boost pressure and/or CAC pressure is greater than atmospheric pressure), condensate may form if the CAC temperature falls below the dew point temperature. When the charge air includes recirculated exhaust gasses, the condensate can become acidic and corrode the CAC housing. The corrosion can lead to leaks between the air charge, the atmosphere, and possibly the coolant in the case of water-to-air coolers. Further, if condensate builds up in the CAC, it may be ingested by the engine during times of increased airflow. As a result, unstable combustion and/or engine misfire may occur. The engine 10 may further include one or more oxygen sensors positioned in the intake passage 42 and/or the intake manifold 44.

The intake manifold 44 includes a MAP sensor 122 for measuring an absolute manifold pressure (MAP). As discussed further below, the output of the MAP sensor 122 may be used to estimate other engine system pressures such as BP. In some embodiments, the intake passage 42 may include a boost pressure sensor 126. However, in other embodiments, the intake passage may not include the boost pressure sensor 126. Additionally, a mass air flow (MAF) sensor 120 may be positioned in the intake passage 42, upstream of the compressor 60.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from the MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. The MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors not depicted may also be present, such as a sensor for determining ambient air temperature and/or humidity, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIGS. 2-5.

In one example, engine 10 may be a variable displacement engine (VDE) capable of operating in a VDE mode wherein one or more cylinders are selectively deactivated. For example, engine 10 may be a V-engine wherein combustion chambers 30 are arranged into a first bank of cylinders and a second bank of cylinders. In another example, engine 10 may be an in-line engine (as shown in FIG. 1) wherein one or more cylinders may be selectively deactivated (e.g., any number of cylinders may be deactivated). As one example, during low engine loads when the full torque capability of the engine is not needed, one or more cylinders 30 of the engine 10 (or of a selected engine bank) may be selectively deactivated (herein also referred to as a VDE mode of operation). This may include deactivating fuel and spark on the selected engine cylinder(s) or cylinder bank. Specifically, one or more cylinders or one or more cylinders of the selected group of cylinders may be deactivated by shutting off respective fuel injectors while maintaining operation of the intake and exhaust valves such that air may continue to be pumped through the cylinders. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled. This requires higher manifold pressures, resulting in lowered pumping losses and increased engine efficiency. Also, the lower effective surface area (from only the enabled cylinders) exposed to combustion reduces engine heat losses, improving the thermal efficiency of the engine. In one example, an engine controller may selectively deactivate all the cylinders of a given engine bank during shift to a VDE mode and then reactivate the cylinders during a shift back to a non-VDE mode. In another example, the controller may selectively deactivate a subset of a total number of engine cylinders 10 during VDE mode. During the deactivation, the controller may increase boost, thereby increase the manifold pressure and allowing the active engine cylinders to deliver the required torque.

The system of FIG. 1 provides for an engine system including an intake passage including an intake throttle, a turbocharger including a compressor at least partially driven by an exhaust-driven turbine, a charge air cooler (CAC) positioned upstream of the throttle and downstream of the compressor, and a compressor bypass valve (CBV) positioned in a bypass passage coupled between the intake passage downstream of the CAC and the intake passage upstream of the compressor. The system further includes a controller with computer readable instructions for transiently increasing airflow through the CAC by one or more of selectively deactivating one or more cylinders of the engine or opening the CBV responsive to condensate formation in the CAC and maintaining engine torque by increasing boost pressure. The system further includes an electric machine coupled to the turbocharger, the electric machine providing rotative power to the compressor to increase boost pressure. The engine may be a variable displacement engine (VDE) where selectively deactivating one or more cylinders of the engine includes operating in a VDE mode. Additionally, selectively deactivating one or more cylinders of the engine includes disabling fueling to the one or more deactivated cylinders while maintaining operation of all cylinder intake and exhaust valves.

As discussed above, condensate may form within a charge air cooler (CAC). Over time, condensate may accumulate within the CAC, thereby resulting in an increasing level (or amount) of condensate within the CAC. During conditions of increased airflow through the CAC (such as during a tip-in), condensate may be blown out of the CAC and enter the engine. In some cases, this may cause unstable combustion and/or engine misfire. In one example, reducing condensate build-up within the CAC may reduce engine misfire and/or unstable combustion events. Condensate build-up may be reduced by periodically and/or opportunistically purging condensate from the CAC by increasing airflow through the CAC. Increasing airflow through the CAC may include increasing an amount of airflow or an airflow rate (e.g., mass air flow rate) through the CAC. As airflow through the CAC increases, condensate may be stripped from the cooling tubes and carried out of the CAC and into the charge air flow to the intake manifold. The purging of condensate from the CAC may occur before condensate has built-up to a threshold level within the CAC, the threshold level being an amount of condensate that may cause unstable combustion and/or misfire if ingested at once by the engine. The controller of the engine may initiate a condensate purging cycle periodically (as a preventative action), when condensate-forming conditions are present (e.g., increased humidity and/or decreased CAC temperature), or when the CAC condensate level increases above a threshold level.

The controller may increase airflow through the CAC to remove condensate from the CAC using various methods. However, in order to maintain torque during the increase in airflow, the controller may need to adjust additional engine operating parameters. For example, increasing airflow through the CAC also increases airflow (e.g., mass air flow) to the engine, thereby increasing torque if no other adjustments are made. In order to maintain torque, compensating actions may be taken to reduce torque in order to deliver the demanded torque. In one example, the controller may open a compressor bypass valve (CBV) arranged in a bypass passage around the compressor and CAC while also increasing boost (e.g., boost pressure) in order to increase airflow through the CAC to reduce condensate build-up while also maintaining the demanded torque. As discussed above, opening the CBV in the bypass passage may divert air from downstream of the CAC to upstream of the compressor. Opening the CBV may therefore increase the amount of air flowing through the CAC, thereby stripping condensate from the CAC and reducing condensate build-up within the CAC. By simultaneously increasing boost (e.g., increasing the boost pressure delivered to the intake manifold by the compressor), the MAP may be maintained at a desired level to deliver the torque demand. Said another way, opening the CBV may increase airflow through the CAC while decreasing boost pressure and MAP and increasing boost may increase the boost pressure and MAP. By coordinating the increase in boost generated by the compressor and the decrease in boost by opening the CBV, the engine may produce the demanded torque.

As described above, as the compressor rotates more quickly, more boost may be generated. If the compressor is primarily driven by the turbine, the controller may adjust engine operation to increase exhaust flow, thereby increasing turbine speed and subsequently compressor speed. However, if the turbocharger is an electric turbocharger or an electrically-assisted turbocharger, the electric machine coupled to the turbocharger may more quickly increase the speed of the compressor to deliver the increased boost pressure. Boost pressure and torque may also be adjusted by adjusting a position of the wastegate and/or throttle.

In another example, the controller may operate the engine in a VDE mode while increasing boost in order to increase airflow through the CAC to reduce condensate build-up while also maintaining the demanded torque. As discussed above, engine operation in VDE mode may include selectively deactivating fueling to one or more cylinders of the engine while maintaining operation of the intake and exhaust valves of all the engine cylinders. As a result, the deactivated cylinders may not combust fuel or provide engine power, however they may continue to pump air. The pumping of air through the deactivated cylinders increases airflow through the CAC, thereby stripping condensate from the CAC. When operating in VDE mode, boost may be increased to increase the MAP so that the active cylinders may deliver the demanded torque. As a result, an increase in total airflow through the engine may increase during VDE operation so that the active cylinders may deliver the torque demand.

In this way, a method for an engine comprises transiently increasing airflow through a charge air cooler of the engine by one or more of operating in a VDE mode or opening a compressor bypass valve and maintaining engine torque by increasing boost pressure. In one example, transiently increasing airflow through the charge air cooler (CAC) is performed periodically when condensate forming conditions are present, the condensate forming conditions including one or more of an ambient humidity over a threshold humidity, a CAC temperature below a threshold temperature, and an ambient temperature below a threshold temperature. In another example, the transiently increasing airflow through the charge air cooler (CAC) is responsive to one or more of a condensate level or a condensate accumulation rate within the CAC over a threshold.

The method further comprises transiently increasing airflow through the CAC by operating in the VDE mode when the compressor bypass valve cannot be opened and temporarily operating in the VDE mode is possible based on engine operating conditions. In one example, the engine operating parameters may include torque demand below a threshold. Further, the method comprises transiently increasing airflow through the CAC by opening the compressor bypass valve and not by operating in VDE mode when the compressor bypass valve is able to be opened based on engine operating conditions. The engine operating conditions may include a compressor surge condition and/or MAP greater than required to produce the torque demand.

Operating in VDE mode to increase airflow through the CAC includes selectively deactivating one or more cylinders of the engine by disabling fueling to the one or more cylinders while maintaining operation of cylinder intake and exhaust valves. Additionally, a number of the one or more deactivated cylinders is based on a condensate level in the CAC, the number of the one or more deactivated cylinders increasing with increasing condensate level in the CAC. Opening the compressor bypass valve (CBV) to increase airflow through the CAC includes opening the CBV to a percentage opening, the percentage opening increasing with increasing condensate level in the CAC. The CBV is positioned in a bypass passage positioned between an intake passage downstream of the CAC and the intake passage upstream of a compressor of the engine. Further still, maintaining engine torque by increasing boost pressure includes one or more of increasing exhaust flow to a turbine driving a compressor, closing a wastegate, and operating an electric turbocharger.

The method further comprises, stopping increasing airflow through the CAC by one or more of switching from VDE operation to non-VDE operation or closing the CBV responsive to a condensate level in the CAC decreasing below a threshold. In another example, the method comprises stopping increasing airflow through the CAC by one or more of switching from VDE operation to non-VDE operation or closing the CBV responsive to a torque demand over a threshold.

Turning now to FIG. 2, a method 200 is shown for operating an engine in VDE mode. For example, the method 200 may show normal VDE operation based on engine operating conditions. Instructions for carrying out method 200 may be stored in a memory of a controller (such as controller 12 shown in FIG. 1).

The method begins at 202 by estimating and/or measuring engine operating conditions. Engine operating conditions may include engine speed/load, boost, torque demand, MAP, a number of active or deactivated cylinders, air-fuel ratio, MAF, conditions of a CAC (e.g., temperature, pressure, and condensate level), etc. The method at 202 may also include determining a current engine mode of operation, particularly with or without cylinder deactivation (e.g., VDE or non-VDE), and a desired mode of operation. For example, if the torque demand is low, the controller may determine that one or more cylinders can be deactivated while the torque demand is met by the remaining active cylinders. In comparison, if the torque demand is high, the controller may determine that all the cylinders need to remain active. In another example, all cylinders may be deactivated if an engine idle-stop condition is met.

At 204, the method includes determining if VDE mode conditions are met. In one example, VDE mode (e.g., cylinder deactivation) conditions may be confirmed when torque demand is less than a threshold. If VDE mode conditions are not confirmed, at 206, the method includes maintaining all the cylinders in an active mode undergoing combustion (e.g., engine is maintained in non-VDE mode). On the other hand, if VDE mode conditions are confirmed, at 208, the method may selectively deactivate one or more cylinders. Selectively deactivating cylinders at 208 may include shutting off fueling to one or more cylinders while maintaining operation of the exhaust and intake valves, the number of deactivated cylinders based on engine operating conditions such as engine load. In other embodiments, selectively deactivating cylinders may include disabling fuel and the exhaust and intake valves to one or more cylinders.

At 210, the method includes determining if non-VDE conditions are met. In other words, the method at 210 determines if cylinder reactivation conditions are met. In one example, non-VDE conditions may be met when the engine torque demand increases above a threshold. In another example, non-VDE conditions may be considered met when the engine has operated in the VDE mode for a specified duration. If non-VDE mode conditions are not met, at 212, the method continues to maintain engine operation in VDE mode, thereby maintaining the deactivated cylinders in their deactivated state. Else, at 214, the deactivated cylinders may be reactivated. In one example, reactivation may include the engine being operated in a non-VDE mode.

In some embodiments, the standard VDE operation shown in method 200 may be overridden based on condensate conditions of the CAC. For example, even if VDE conditions are not met, the controller may switch the engine from a non-VDE mode to VDE mode if condensate formation in the CAC is over a threshold. In another example, standard VDE operation may be adjusted based on CAC condensate such that the number of deactivated cylinders is based on a condensate level in the CAC. Further details on adjusting VDE operation based on CAC condensate are discussed below with reference to FIG. 4 and FIG. 7.

FIG. 3 shows a method 300 for operating a compressor bypass valve (CBV). In one example, the CBV valve is positioned in a bypass passage positioned between an intake passage downstream of a CAC and the intake passage upstream of a compressor (such as the bypass passage 29 and CBV 27 shown in FIG. 1). As such, upon opening the CBV, air flow is routed from downstream of the compressor to upstream of the compressor. Opening the CBV may result in increased airflow through the CAC. As discussed further below, opening the CBV may be based on compressor surge conditions under standard operation of the CBV. Instructions for carrying out method 300 may be stored in a memory of a controller (such as controller 12 shown in FIG. 1). As such, method 300 may be executed by the controller.

Method 300 begins by estimating and/or measuring engine operating conditions. Engine operating conditions may include engine speed and/or load, torque demand, MAP, MAF, boost, etc. At 304, the method includes determining if compressor surge conditions are present. Compressor surge conditions may be based on boost pressure, MAP, and/or MAF. Compressor surge conditions may include compressor surge being imminent based on engine operating conditions and/or compressor surge itself. If surge conditions are not present, the method continues to 306 to maintain the CBV closed such that no air is recirculated around the CAC and compressor. Alternately, if surge conditions are present, the method continues to 308 to determine if the engine is able to open the CBV. For example, if boost is not needed to deliver the torque demand, the engine may be able to open the CBV. However, if increased boost is needed to deliver the demanded toque, the controller may not open the CBV. In other examples, the compressor is surging, the CBV may open automatically. If the CBV cannot be opened, the method continues to 306 to maintain the CBV closed. However, if the CBV can be opened, the method continues to 310 to open the CBV. In one example, opening the CBV may include fully opening the CBV to a maximal percentage opening (or maximal degree of opening). In another example, opening the CBV may include partially opening the CBV to a percentage opening somewhere between 0 and 100% open (e.g., between fully closed and fully open).

At 312, the method includes determining if surge has been mitigated. For example, if surge has not been mitigated or surge conditions are still present, the method may continue to 314 to maintain the CBV open. In an alternate example, the CBV may remain open until the pressure drop across the compressor decreases to a threshold level. If surge has been mitigated, the method continues to 316 to close the CBV.

FIG. 4 shows a method 400 for increasing airflow through the CAC to purge condensate from the CAC. Specifically, method 400 shows increasing airflow through the CAC responsive to condensate formation in the CAC. In an alternate embodiment, method 400 may be run periodically such that airflow is increased through the CAC to decrease condensate at a set interval. In one example, the set interval may be a duration of engine operation or a distance of vehicle travel. Airflow through the CAC may be increased by either operating the engine in VDE mode or opening the CBV while increasing boost to maintain torque. The decision to increase airflow by operating in VDE mode or opening the CBV may be made based on engine operating conditions. Instructions for carrying out method 400 may be stored in a memory of a controller (such as controller 12 shown in FIG. 2) and method 400 may be executed by the controller.

Method 400 begins at 402 by estimating and/or measuring engine operating conditions. Engine operating conditions may include engine speed and load, ambient humidity, conditions of the CAC (e.g., temperature, pressure, and humidity), mass air flow (MAF, a position of the throttle, torque demand, EGR flow, VDE operation, compressor inlet pressure, etc.

At 404, the level of condensate at the CAC may be determined. This may include retrieving details such as ambient air temperature, ambient air humidity, CAC inlet and outlet charge air temperature, CAC inlet and outlet charge air pressure, and air mass flow rate from a plurality of sensors and determining the amount of condensate formed in the CAC based on the retrieved data. Alternatively at 404, the method may include determining the propensity to form condensate. Said another way, at 404 the method may include if condensate forming conditions are present. For example, if the CAC temperature is above a threshold, ambient humidity is above a threshold, and/or it is raining, condensate formation may be likely at the CAC.

In one example, at 406, and as further elaborated at the model of FIG. 5, the rate of condensate formation within the CAC may be based on ambient temperature, CAC outlet temperature, mass flow, EGR, and humidity. In another example, at 408, a condensation formation value may be mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

At 410, the method includes determining if the condensate level at the CAC is higher than a threshold level. As such, the threshold level may correspond to an amount of condensate above which may cause unstable combustion and/or engine misfire if blown out of the CAC and ingested at once by the engine. In some examples, the threshold level may be reduced in order to dry out the CAC more frequently. As discussed above, in other examples, the method at 410 may include determining if condensate is forming or is likely to form within the CAC (based on CAC temperature, pressure, ambient temperature, ambient humidity, rain conditions, etc.). In this example, if condensate is forming or likely to form, the method may continue on to 414. The method at 410 may additionally or alternately include determining if a duration has passed since last purging condensate from the CAC. If the duration has passed, the method may continue to 414.

If condensate in the CAC is not greater than the threshold, the method continues to 412 to maintain engine operation and not increase airflow through the CAC. Alternatively, if condensate formation is likely and/or if the condensate level in the CAC is greater than the threshold level, the method continues on to 414 to determine if it is possible to open the CBV. For example, the method at 414 may include determining if surge is expected or if MAP is greater than required to produce the torque demand. In another example, the method at 414 may include determining if opening the CBV temporarily to increase airflow through the CAC is possible without degrading engine torque output. In some examples, the method at 414 may override standard CBV control as shown at FIG. 3. In this way, opening the CBV responsive to CAC condensate may occur under different conditions (e.g., no surge expected) than during normal engine operation as shown in FIG. 3. If the controller determines the CBV may be opened, the method continues on to 416 to open the CBV and increase boost to increase airflow through the CAC. A method for increasing airflow through the CAC by opening the CBV is shown at FIG. 6, explained further below. As described above and shown in FIG. 1, the CBV valve may be positioned in a bypass passage around the CAC and compressor.

Alternatively at 414, if the controller is unable to open the CBV, the method continues on to 418 to determine if the engine is currently operating in VDE mode. If the engine is currently operating in VDE mode (e.g., with one or more cylinders deactivated), the method continues to 420 to adjust VDE operation and increase boost to increase airflow through the CAC. A method for operating the engine in VDE mode to increase airflow through the CAC is shown at FIG. 7, discussed further below.

If the engine is not currently operating in VDE mode, the method continues to 422 to determine if the engine is able to temporarily operate in VDE mode (e.g., switch from non-VDE operation to VDE operation). For example, the method at 422 may include determining if torque demand is below a threshold such that VDE operation is possible. However, the threshold torque demand for operating in VDE mode due to CAC condensate may be higher than the threshold torque demand for operating in VDE mode during standard engine operation (e.g., based on engine torque and load instead of based on CAC condensate). For example, the threshold for operating in VDE mode may be greater in the method at 422 than in the method at 204. If the engine is able to temporarily operate in VDE mode, the method continues to 424 to switch the engine to VDE operation and increase boost in order to increase airflow through the CAC, as explained further below with regard to FIG. 7.

Alternately, if the engine is not able to operate in VDE mode, the method continues to 426 to decrease CAC condensate using an alternate method. The method at 426 may additionally or alternately include waiting until CBV opening or VDE operation is possible.

FIG. 5 illustrates a method 500 for estimating the amount of condensate stored within a CAC. Based on the amount (e.g., level) of condensate at the CAC relative to a threshold value, an engine controller may increase airflow through the CAC while maintain torque by operating in VDE mode or opening a CBV while increasing boost pressure, as discussed at FIG. 4.

The method begins at 502 by determining the engine operating conditions. These may include, as elaborated previously at 402, ambient conditions, CAC conditions (inlet and outlet temperatures and pressures, flow rate through the CAC, etc.), mass air flow, MAP, EGR flow, engine speed and load, engine temperature, boost, etc. Next, at 504, the routine determines if the ambient humidity is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set to 100% at 506. However, if the humidity is known, the known humidity value, as provided by the humidity sensor, may be used as the humidity setting at 508.

The ambient temperature and humidity may be used to determine the dew point of the intake air, which may be further affected by the amount of EGR in the intake air (e.g., EGR may have a different humidity and temperature than the air from the atmosphere). The difference between the dew point and the CAC outlet temperature indicates whether condensation will form within the cooler, and the mass air flow may affect how much condensation actually accumulates within the cooler. At 510, an algorithm may calculate the saturation vapor pressure at the CAC outlet as a function of the CAC outlet temperature and pressure. The algorithm then calculates the mass of water at this saturation vapor pressure at 512. Finally, the condensation formation rate at the CAC outlet is determined at 514 by subtracting the mass of water at the saturation vapor pressure condition at the CAC outlet from the mass of water in the ambient air. In some examples, the method at 514 may first determine a mass of water formation over time. Integrating this value may then give the mass of water within the CAC (e.g., condensate formation value). By determining the amount of time between condensate measurements at 516, method 500 may determine the amount of condensate within the CAC since a last measurement at 518. The current condensate amount in the CAC is calculated at 522 by adding the condensate value estimated at 518 to the previous condensate value and then subtracting any condensate losses since the last routine (that is, an amount of condensate removed, for example, via purging routines) at 520. Condensate losses may be assumed to be zero if the CAC outlet temperature was above the dew point. Alternatively, at 520, the amount of condensate removed may be modeled or determined empirically as a function of air mass and integrated down with each software task loop (that is, with each run of routine 500).

As such, the method of FIG. 5 may be used by the controller during the routine of FIG. 4 to use a modeling method for estimating the amount of condensate at the CAC. In alternate embodiments, the engine control system may use a mapping method to map the amount of condensate at the CAC to a CAC inlet/outlet temperature, an ambient humidity, and an engine load. For example, the values may be mapped and stored in a look-up table that is retrieved by the controller during the routine of FIG. 4, and updated thereafter.

Turning now to FIG. 6, a method 600 is shown for increasing airflow through the CAC to purge condensate from the CAC by opening a CBV while increasing boost. As discussed above, the CBV may be arranged in a bypass passage arranged between the intake passage downstream of the CAC and the intake passage upstream of the compressor. Thus, opening the CBV may recirculate air from downstream of the CAC to upstream of the compressor, thereby increasing the amount of airflow through the CAC. Method 600 may continue from step 416 of method 400.

Method 600 begins at 602 by determining a desired degree of CBV opening (e.g., percentage opening between 0 and 100% open) based on CAC condensate. For example, as the condensate level in the CAC increases, the CBV may be opened by a greater degree (or opened to a larger percentage opening). As such, the percentage opening of the CBV may be based on an airflow increase required to blow the condensate stored within the CAC out of the CAC. At 604, the controller may open the CBV to the determined opening. As explained above, the method at 604 may include fully opening the CBV such that the valve is 100% open or opening the CBV to a percentage opening somewhere between 0 and 100%.

At 606, the method includes increasing boost to maintain torque during the opening of the CBV. The methods at 604 and 606 may occur simultaneously such that the CBV opening and boost are both increased at the same time. Increasing boost may include increasing rotation of the compressor by increasing exhaust flow through the turbine coupled to the compressor. In one example, increasing exhaust flow through the turbine may include adjusting engine operation and/or adjusting a position of a wastegate. In another example, increasing boost pressure may include increasing rotational output of the compressor by operating an electric machine coupled to the compressor (e.g., operating an electric turbocharger). In yet another example, increasing boost may include adjusting a position of a throttle positioned downstream of the CAC. The amount of increase in boost level may be the amount of boost increase required to maintain the MAP to deliver the torque demand while opening the CBV to the desired opening. As such, the increase in boost may compensate for opening the CBV and thus boost may increase further as the CBV opening increases.

At 608, the method includes determining if the condensate level in the CAC is below a threshold level and/or if a duration has passed. For example, after the condensate level has decreased back below the threshold level, increasing airflow through the CAC may be stopped. In another example, the controller may increase airflow through the CAC for a duration. The duration may be based on the amount of condensate, a time required to purge condensate from the CAC, and/or a time that the engine may be operated with the CBV open. In some examples, the controller may shorten the duration if torque demand suddenly increases above a threshold (e.g., during a tip-in), thereby requiring increased engine torque output. If the condensate level is not less than the threshold level and/or the duration has not passed, the controller may maintain the CBV open and the increased boost level at 610. However, if the CAC condensate level is less than the threshold and/or the duration has passed, the method continues to 612 to return to normal CBV operation (as shown at FIG. 3) and return boost to a requested level (based on the torque demand). The method at 612 may include closing the CBV or adjusting the position of the CBV based on engine operating conditions determined in the method shown at FIG. 3.

FIG. 7 shows a method for increasing airflow through the CAC to purge condensate from the CAC by deactivating one or more engine cylinders while increasing boost. Deactivating one or more engine cylinders may also be referred to herein as operating in a VDE mode. During cylinder deactivation, or VDE mode, fueling may be disabled to the one or more deactivated engine cylinders while the intake and exhaust valves remain operational. As such, during cylinder deactivation, air may continue to pump through the deactivated cylinders, thereby increasing airflow through the CAC. As more cylinders are deactivated, the amount of airflow through the CAC may increase further. Method 700 may continue from step 420 and/or step 424 of method 400.

Method 700 begins at 702 by determining a number of engine cylinders to deactivate based on CAC condensate. For example, as the condensate level in the CAC increases, the controller may deactivate a larger number of cylinders. As such, the number of deactivated cylinders may be based on an airflow increase required to blow the condensate stored within the CAC out of the CAC. In another example, the number of deactivated cylinders may also be based on current VDE operation (if the engine was already in VDE mode), and/or the engine torque demand.

At 704, the controller deactivates the determined number of cylinders by shutting off fueling to those cylinders. At 706, the method includes increasing boost to increase MAP and deliver the demanded torque with the active cylinders. The method at 706 may also include adjusting the wastegate and/or throttle to deliver torque during VDE operation. The methods at 704 and 706 may occur simultaneously such that the VDE operation and boost increase occur at the same time. As discussed above, increasing boost may include increasing rotation of the compressor by increasing exhaust flow through the turbine. Increasing exhaust flow through the turbine to increase boost may include adjusting one or more of engine operation, a wastegate, or an electric machine such as an electric turbocharger.

At 708, the method includes determining if the condensate level in the CAC is below a threshold level and/or if a duration has passed. For example, after the condensate level has decreased back below the threshold level, increasing airflow through the CAC may be stopped. In another example, the controller may increase airflow through the CAC for a duration. The duration may be based on the amount of condensate, a time required to purge condensate from the CAC, and/or a time that the engine may be operated in VDE mode with the one or more cylinders deactivated. In some examples, the controller may shorten the duration if torque demand suddenly increases above a threshold (e.g., during a tip-in), thereby requiring increased engine torque output. If the condensate level is not less than the threshold level and/or the duration has not passed, the controller may maintain VDE operation and the increased boost level at 710. However, if the CAC condensate level is less than the threshold and/or the duration has passed, the method continues to 712 to reactivate the deactivated cylinders and/or return to normal VDE operation (as shown at FIG. 2) and return boost to a requested level (based on the torque demand).

Turning now to FIG. 8, a graphical example of adjusting engine parameters to increase airflow through the CAC responsive to CAC condensate is shown. Specifically, graph 800 shows changes in CAC condensate level at plot 802, changes in airflow through the CAC at plot 804, changes in CBV opening at plot 806, changes in VDE operation at plot 808, changes in boost level at plot 810, and changes in torque at plot 812.

Prior to time t1, the CBV may be closed and the engine may not be operating in VDE mode (e.g., all cylinders are active). CAC airflow may be at a fairly low and steady level while CAC condensate level is increasing (plot 802). At time t1, the condensate level in the CAC increases above a threshold level, T1. In response, the controller opens the CBV to increase airflow through the CAC (plot 806). The controller may open the CBV since torque is below a threshold and opening the CBV may not degrade engine torque output. In an alternate embodiment, the controller may operate the engine in VDE mode at time t1 instead of opening the CBV. Between time t1 and time t2, the CBV is opened to a percentage opening somewhere between 0% (fully closed) and 100% open (fully open). The percentage opening of the CBV is based on the CAC condensate level. For example, the controller may open the CBV to a greater opening percentage as the amount of condensate above the threshold level T1 increases. Also at time t1, the controller increases boost (plot 810) in order to maintain torque (plot 812) during the opening of the CBV and increasing airflow through the CAC. As CAC airflow increases, the condensate level in the CAC decreases (plot 802).

At time t2, the CAC condensate level decreases below the threshold level T1 (plot 802). As a result, the controller closes the CBV (plot 806) and returns CBV operation to standard CBV operation based on engine operating conditions and not based on CAC condensate. Boost pressure decreases to return boost to a level required to produce the torque demand (plot 810). Between time t2 and time t3 torque demand may decrease and the engine may switch into a VDE mode by deactivating one or more engine cylinders (plot 808). At time t3, the CAC condensate level increases above the threshold level T1. As a result of the CAC condensate level increasing above the threshold and the engine already operating in VDE mode, the controller may adjust VDE operation in order to increase airflow through the CAC (plot 804) and purge condensate from the CAC and into the engine intake. For example, at time t3, the engine may be unable to open the CBV to increase airflow since the engine is already operating in VDE mode. At time t3, the controller may adjust VDE operation to further increase CAC airflow. This may include deactivating additional cylinders based on the condensate level during the VDE operation. Also at time t3, the controller further increases boost (plot 810) in order to increase MAP to deliver the torque with the remaining active cylinders.

At time t4, a tip-in occurs and causes torque demand to increase above a threshold level (plot 812). In response to the increase in torque demand over the threshold, the controller switches from VDE mode to non-VDE mode by reactivating the deactivated engine cylinders (plot 808). Boost may remain at a higher level in order to deliver the increased torque demand with all the activated cylinders. After time t4, the controller may not operate in VDE mode or open the CBV even though the CAC condensate level is above the threshold level T1 since torque demand remains above the threshold torque level.

As shown at time t1 in FIG. 8, a method for an engine includes during a first condition, increasing airflow through a charge air cooler (CAC) by opening a compressor bypass valve while increasing boost pressure in response to a condensate level in the CAC increasing above a threshold. The first condition includes one or more of a surge condition or a manifold pressure greater than required to produce a torque demand. Additionally, as shown at time t2, the method includes stopping increasing airflow through the CAC by closing the CBV responsive to the CAC condensate level decreasing below the threshold level.

The method further includes, during a second condition (as shown at time t3), increasing airflow through the CAC by selectively deactivating one or more cylinders of the engine while increasing boost pressure in response to the condensate level in the CAC increasing above the threshold. The second condition includes when the CBV is unable to be opened and one or more of the engine is already operating with one or more cylinders deactivated or engine torque demand is below a threshold for temporarily operating with one or more cylinders deactivated.

The method further comprises during a third condition (as shown after time t4), not increasing airflow through the CAC, maintaining the CBV closed, and maintaining all cylinders active even when a condensate level in the CAC is above the threshold level, the third condition including when the CBV is unable to be opened and the engine is unable to deactivate one or more cylinders due to engine operating conditions including torque demand over a threshold. Additionally, as shown at time t4, the method includes stopping increasing airflow through the CAC by reactivating the one or more deactivated cylinders responsive to the torque demand increasing over a threshold.

In this way, condensate may be periodically or opportunistically purged from the CAC by increasing airflow through the CAC. An engine controller may increase airflow through the CAC by either operating the engine in a VDE mode or opening a CBV valve arranged in a bypass passage around the CAC and the compressor. At the same time, the controller may increase boost in order to maintain torque during the increasing airflow through the CAC. A technical effect of decreasing an amount of condensate stored within the CAC is achieved by periodically and/or opportunistically increasing airflow through the CAC in this way. By reducing the amount of condensate within the CAC, engine misfire and/or unstable combustion due to ingestion of large amounts of condensate may be reduced.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
transiently increasing airflow through a charge air cooler (CAC) of the engine by operating in a VDE mode; and
maintaining engine torque by increasing boost pressure.

2. The method of claim 1, wherein the transiently increasing airflow through the CAC is performed periodically when condensate forming conditions are present, the condensate forming conditions including one or more of an ambient humidity over a threshold humidity, a CAC temperature below a threshold temperature, and an ambient temperature below a threshold temperature.

3. The method of claim 1, wherein the transiently increasing airflow through the CAC is responsive to one or more of a condensate level or a condensate accumulation rate within the CAC over a threshold.

4. The method of claim 1, further comprising transiently increasing airflow through the CAC by operating in the VDE mode when temporarily operating in the VDE mode is possible based on engine operating conditions.

5. The method of claim 1, wherein operating in the VDE mode to increase airflow through the CAC includes selectively deactivating one or more cylinders of the engine by disabling fueling to the one or more cylinders while maintaining operation of cylinder intake and exhaust valves.

6. The method of claim 5, wherein a number of the one or more deactivated cylinders is based on a condensate level in the CAC, the number of the one or more deactivated cylinders increasing with increasing condensate level in the CAC.

7. The method of claim 1, wherein maintaining engine torque by increasing boost pressure includes one or more of increasing exhaust flow to a turbine driving a compressor, closing a wastegate, and operating an electric turbocharger.

8. The method of claim 1, further comprising stopping increasing airflow through the CAC by one or more of switching from VDE operation to non-VDE operation responsive to a condensate level in the CAC decreasing below a threshold.

9. The method of claim 1, further comprising stopping increasing airflow through the CAC by switching from VDE operation to non-VDE operation responsive to a torque demand over a threshold.

10. A method for an engine comprising:
during a first condition,
increasing airflow through a charge air cooler (CAC) by selectively deactivating one or more cylinders of the engine while increasing boost pressure in response to a condensate level in the CAC increasing above a threshold.

11. The method of claim 10, wherein the first condition includes one or more of a surge condition or a manifold pressure greater than required to produce a torque demand.

12. The method of claim 10, wherein the first condition includes when the engine is already operating with one or more cylinders deactivated or engine torque demand is below a threshold for temporarily operating with one or more cylinders deactivated.

13. The method of claim 10, further comprising during a second condition, not increasing airflow through the CAC, and maintaining all cylinders active even when the condensate level in the CAC is above the threshold, the second condition including when the engine is unable to deactivate one or more cylinders due to engine operating conditions including torque demand over a threshold.

14. The method of claim 10, further comprising stopping increasing airflow through the CAC by reactivating the one or more deactivated cylinders responsive to one or more of the condensate level in the CAC decreasing below the threshold or a torque demand over a threshold.

15. A system for an engine, comprising:
an intake passage including a throttle;
a turbocharger including a compressor at least partially driven by an exhaust-driven turbine;
a charge air cooler (CAC) positioned upstream of the throttle and downstream of the compressor;
and
a controller with computer readable instructions for:
transiently increasing airflow through the CAC by one or more of selectively deactivating one or more cylinders of the engine responsive to condensate formation in the CAC; and
maintaining engine torque by increasing boost pressure.

16. The system of claim 15, further comprising an electric machine coupled to the turbocharger, the electric machine providing rotative power to the compressor to increase boost pressure, wherein the engine is a variable displacement engine (VDE), and wherein selectively deactivating one or more cylinders of the engine includes operating in a VDE mode.

17. The system of claim 15, wherein selectively deactivating one or more cylinders of the engine includes disabling fueling to the one or more deactivated cylinders while maintaining operation of all cylinder intake and exhaust valves.

* * * * *